US011827808B2

(12) United States Patent
Perpall et al.

(10) Patent No.: US 11,827,808 B2
(45) Date of Patent: Nov. 28, 2023

(54) EROSION AND CORROSION RESISTANT OVERLAY COATING SYSTEMS FOR PROTECTION OF METAL COMPONENTS

(71) Applicants: Mark W Perpall, Indianapolis, IN (US); Irina Belov, Zionsville, IN (US)

(72) Inventors: Mark W Perpall, Indianapolis, IN (US); Irina Belov, Zionsville, IN (US)

(73) Assignee: Praxair S.T. Technology, Inc., North Haven, CT (US)

( * ) Notice: Subject to any disclaimer, the term of this patent is extended or adjusted under 35 U.S.C. 154(b) by 640 days.

(21) Appl. No.: 16/776,927

(22) Filed: Jan. 30, 2020

(65) Prior Publication Data
US 2020/0248007 A1 Aug. 6, 2020

Related U.S. Application Data

(60) Provisional application No. 62/800,037, filed on Feb. 1, 2019.

(51) Int. Cl.
| | | |
|---|---|---|
| C09D 5/10 | (2006.01) |
| C09D 5/08 | (2006.01) |
| C09D 7/62 | (2018.01) |
| C09D 7/40 | (2018.01) |
| C09D 175/06 | (2006.01) |
| C08G 18/44 | (2006.01) |
| C23F 11/173 | (2006.01) |
| C08G 18/73 | (2006.01) |

(52) U.S. Cl.
CPC ............. *C09D 5/103* (2013.01); *C09D 5/084* (2013.01); *C09D 7/62* (2018.01); *C09D 7/66* (2018.01); *C09D 7/70* (2018.01); *C09D 175/06* (2013.01); *C08G 18/44* (2013.01); *C08G 18/73* (2013.01); *C23F 11/173* (2013.01)

(58) Field of Classification Search
None
See application file for complete search history.

(56) References Cited

U.S. PATENT DOCUMENTS

| | | |
|---|---|---|
| 3,248,251 A | 4/1966 | Charlotte |
| 5,486,096 A | 1/1996 | Hertel et al. |
| 5,905,151 A | 5/1999 | Slack et al. |
| 5,912,195 A | 6/1999 | Walla et al. |
| 5,985,454 A | 11/1999 | McMordie et al. |
| 6,341,747 B1 | 1/2002 | Schmidt et al. |
| 7,993,438 B2 | 8/2011 | Mosser et al. |
| 9,017,464 B2 | 4/2015 | Belov et al. |
| 9,322,101 B2 | 4/2016 | Belov et al. |
| 9,394,448 B2 | 7/2016 | Belov et al. |

(Continued)

FOREIGN PATENT DOCUMENTS

| | | |
|---|---|---|
| CN | 102433059 A | 5/2012 |
| CN | 106752837 A | 5/2017 |

(Continued)

*Primary Examiner* — Jeffrey D Washville

(57) ABSTRACT

Polyurethane-based coatings which exhibit superior erosion and heat resistance combined with antifouling and chemical resistance that are useful for protection of metal components are provided. The coatings are characterized by enhanced particle erosion resistance and enhanced heat resistance and are derived from specific multicomponent slurry compositions.

29 Claims, 8 Drawing Sheets
(7 of 8 Drawing Sheet(s) Filed in Color)

(56) References Cited

U.S. PATENT DOCUMENTS

| | | |
|---|---|---|
| 10,066,121 B2 | 9/2018 | Weber et al. |
| 2005/0271881 A1 | 12/2005 | Hong |
| 2006/0016601 A1 | 1/2006 | Chatterji et al. |
| 2006/0281861 A1 | 12/2006 | Putnam |
| 2010/0098956 A1 | 4/2010 | Sepeur et al. |
| 2015/0090154 A1* | 4/2015 | Belov .................... B05D 3/007 106/14.21 |
| 2015/0183998 A1* | 7/2015 | Belov .................... C23C 24/082 106/14.12 |
| 2016/0008846 A1 | 1/2016 | Barth et al. |
| 2017/0022369 A1 | 1/2017 | von Schleinitz |

FOREIGN PATENT DOCUMENTS

| | | | | |
|---|---|---|---|---|
| EP | 2412771 B1 | | 1/2014 | |
| EP | 3670556 A1 | * | 6/2020 | ............... B05D 7/50 |
| WO | 2016/000845 A1 | | 4/2015 | |

* cited by examiner

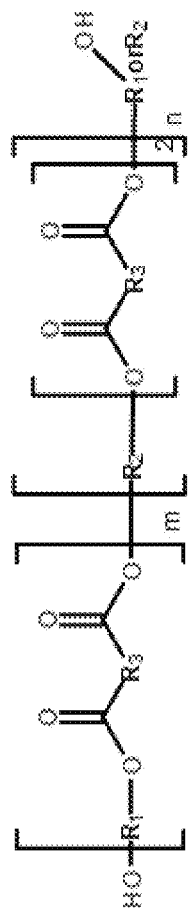
Figure 3A.
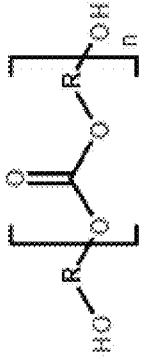
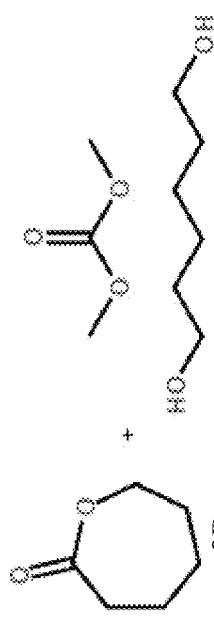
Figure 3B.
Figure 3C.
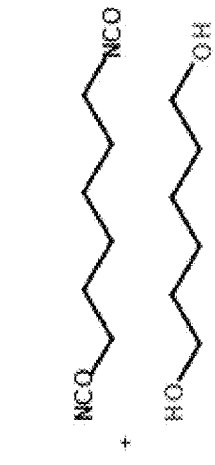
Figure 3D.
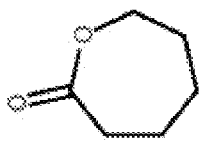
Figure 3E.
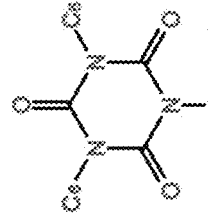
Figure 3F.

EROSION AND CORROSION RESISTANT OVERLAY COATING SYSTEMS FOR PROTECTION OF METAL COMPONENTS

CROSS REFERENCE TO RELATED APPLICATION(S)

This application claims the benefit of priority to U.S. provisional application Ser. No. 62/800,037, filed Feb. 1, 2019, the disclosure of which is incorporated by reference herein in its entirety.

FIELD OF THE INVENTION

The present invention relates to novel polyurethane-based formulations which are suitable in the production of protective coatings and exhibit superior erosion and heat resistance combined with antifouling and chemical resistance properties. The coatings of the present invention are particularly beneficial for protection of metal parts in turbomachinery and suitable for adding functionality as a component in a corrosion resistant coating system with an anti-corrosive basecoat as well as a stand-alone overlay coating.

BACKGROUND OF THE INVENTION

Corrosion resistant overlay coating systems that are slurry-derived and based on ceramic binders filled with functional pigments have been used for forming highly corrosion and heat-resistant protective coatings, such as in the protection of turbomachinery, for decades and are still in use today. Such coatings have been employed by original equipment manufacturers (OEMs) in the manufacture of various aircraft components, in the industrial power generation, by the Department of Defense (DoD) as well as in the automotive and industrial fields as high-performance protective coatings.

Customarily, these slurry-derived overlay coating systems comprise a basecoat layer that is sealed with topcoats and/or sealers. The basecoat is generally an aluminum-ceramic composite and is capable of providing sacrificial corrosion protection to various metal substrates. The topcoat/sealer provides additional barrier corrosion protection by sealing porosity and voids in the basecoat, thereby extending the corrosion protective action of the whole overlay system, as well as enhancing its other functional properties (e.g., surface smoothness and antifouling of compressor components, chemical and water resistance, heat oxidation resistance, engine fluids resistance, etc.) and its visual appearance.

The conventional aluminum-ceramic coating typically comprises an acidic chromate-phosphate binder that is filled with fine metallic aluminum powder. Upon curing, the binder forms a matrix that is embedded with the aluminum particles. The matrix provides mechanical integrity to the coating, while the chromate passivated aluminum pigment network imparts efficient corrosion protection. Burnishing aluminum-filled coating by dry grit or glass bead-blasting compresses the coating to render it conductive, galvanically active and sacrificial (i.e., cathodically protective) to all steels. SermeTel W®, as described in U.S. Pat. No. 3,248,251 to Allen ("Allen patent") issued over forty years ago, is recognized in the industry as the performance standard for these types of coatings.

In response to the identification of hexavalent chromium Cr(VI) as an environmentally hazardous material, various Cr-free aluminum ceramic base coats in combination with topcoats have been investigated as potential environmentally benign replacement coating systems, as described in the U.S. Pat. No. 7,993,438, and US Patent Pub. No. 2006/0166014.

Improved Cr-free basecoats that successfully meet functional performance requirements of legacy Cr(VI)— containing basecoats have been disclosed in U.S. Pat. Nos. 9,017,464; 9,322,101; and 9,394,448 to Belov, I. et.al. (collectively, "the Belov patents"), each of which is hereby incorporated by reference in their entirety, respectively. The inventions disclosed in each of these patents relate, in part, to a slurry formulation that is used to produce coatings with superior functional properties. The disclosed slurry formulation in each of the Belov patents employs a chromium-free, lithium-doped potassium silicate binder in combination with an aluminum powder.

Topcoats, as known in the art, can be formed by inorganic binders or by organic resins, depending on desired functionality and service temperatures. The topcoat composition may further contain metal oxide pigments that are chemically inert and heat resistant (such as $Al_2O_3$, $TiO_2$, $Cr_2O_3$, multicomponent oxide spinels, etc.) and/or metal particles. SermeTel™ 2F-1, SermeTel™ 5380DP, SermaFlow™ S4000, ShorCoat™ and SermaLon™ are examples of such slurry-derived overlay basecoat—topcoat coating systems that are commercially available from Praxair Surface Technologies, Inc. (Indianapolis, IN) and widely utilized in the field.

One limitation of slurry-derived overlay coatings is their insufficient performance in erosion resistance for certain applications. Erosion resistance is the ability of a coating or a surface to resist the degrading forces of materials such as air, water droplets, or solid particles impacting onto the coating or the surface. Erosion is manifested either as a gradual thinning of a coating or bulk material, or alternatively as the removal of larger pieces of material such as through flaking or peeling of surface materials. The difference in the mechanism of erosion is related in part to the mechanical properties of the surface where the particle impact occurs. The elasticity and the hardness of the surface both affect the behavior of the coating when impacted with particles, though the effects can differ greatly with other factors such as the angle of impact, the force of impact, and the mechanical properties of the impacting medium.

Because the purpose of the ceramic-based coatings is to protect the substrate, from corrosion and other environmental factors, the gradual removal of the coatings through erosion is detrimental to the capability of the coatings to perform their primary functions. When the protection supplied by the coatings is limited, the lifespan of the protected substrate, and thus the entire structure of the equipment is also limited. Erosion is a particular problem for these coatings when used in environments such as turbomachinery that have large intakes of often unfiltered air, which contains both solid particles and liquid droplets of erosive materials. The increased speed of the particles also has the effect of increasing their impact force and thus their erosive effect. The increasing need for a robust coating system that is capable of withstanding the effects of erosion is apparent.

Topcoats, especially organic resin-based (such as epoxy-, epoxy-melamine-, amide-imide based, etc.) are typically more prone to erosion degradation than inorganic aluminum-ceramic basecoat layers. For example, organic topcoats have been developed by McCordie and Mosser. US Patent No. describes the use of a topcoat to protect against polymerization fouling which reduces aerodynamic efficiencies and reliability of turbomachinery hardware components. The patent further describes a coating system for an organic polymer topcoat employed in combination with corrosion resistant layers of inorganic, aluminum ceramic composite basecoats. This coating system is commercially available under the name SermaLon™ from Praxair Surface Technologies, Inc. (Indianapolis, IN) and widely employed in the industry, specifically as corrosion and antifouling protection for centrifugal compressors. SermaLon™ coating systems have represented the benchmark in corrosion protection and hydrocarbon fouling resistance. However, the erosion resistance of the topcoat in the SermaLon™ coating system may be insufficient in certain applications, and can lead to relatively fast material loss from the topcoat (see erosion resistance data of FIG. 1B), thus resulting in performance deterioration and a shortened lifespan of the SermaLon™ coating system.

Polyurethane-based coatings have also been used in the industry for the protection against erosion in such applications as aerospace coatings, and wind turbine blades because of their ability to absorb and disperse impact energy, known as impact damping, combined with chemical resistance, flexibility, UV resistance, weatherability, and hardness properties. Polyurethane-base coatings are also beneficial as a result of the ability of their physical and chemical properties to be efficiently tailored and optimized for a particular use and service conditions.

Erosion resistant coatings have been described in the art, including patents and patent publications for nanoparticle containing elastomers (including polyurethanes) in U.S. Pat. No. 6,341,747 B1; elastomers (including polyurethanes) with hard particles "embedded onto an outer side" in US Patent Publication No. 2016/0008846 A1; a fast curing polyurethane polyurea copolymer in International Patent Publication No. WO 2016/000845 A1; polyurethanes based off isocyanate-terminated polyurethane prepolymers cured with polyaspartic esters, aldimines, and/or ketimines in US Patent Publication No. 20005/0271881 A1; a polyurethane containing a fluorinated alcohol in U.S. Pat. No. 10,066,121 B2; a fiber supported elastomer (including polyurethanes) composite in U.S. Pat. No. 5,912,195; as well as silicone and fluoropolymer elastomer based coatings in European Patent No. EP Patent No. 2,412,771 B1 and US Patent Publication No. 2006/0281861 A1 respectively.

A significant limitation of the aforementioned polyurethane coatings is their heat resistance. This is not a typical property of this class of polymers, as the heat resistance of polyurethanes is typically limited to about 300-350 F because the reaction of a polyol with an isocyanate to form a urethane linkage (or the analogue reaction of an amine with an isocyanate to form a urea linkage) is a thermodynamically reversible reaction and at higher temperatures the reverse depolymerization reaction would predominate leading to loss of molecular weight and subsequent deterioration of the polymer matrix mechanical properties.

As can be seen there is still an existing need for high performance coatings that can exhibit improved erosion resistance combined with thermal stability at elevated temperatures, aerodynamic smoothness, and compatibility with corrosion resistant basecoats while maintaining all other requisite properties of existing ceramic topcoats encountered in the turbomachinery service temperatures.

SUMMARY OF THE INVENTION

In a first aspect, a multicomponent slurry composition for the production of an overlay erosion and corrosion resistant coating system for protection of metal components from corrosion, erosion and fouling, said slurry composition comprising: a basecoat slurry; a topcoat slurry, said topcoat slurry comprising:—a branched polyester polyol;—a polycarbonate diol; an aliphatic trimer of hexamethylene diisocyanate;—wherein a ratio of equivalent isocyanate functional groups to equivalent alcohol functional groups ranges from 1.0:1.6 to 1.6:1.0; and-one or more metal oxide pigments.

In a second aspect, an overlay erosion and corrosion resistant coating system for protection of metal components from corrosion, erosion and fouling, said coating comprising: a corrosion resistant basecoat comprising a matrix formed by a chromate-phosphate based binder filled with aluminum particles; and a topcoat comprising a polyurethane-based matrix formed by polymerization of a polyol, a diol and a polyisocyanate; one or more metal oxide pigments embedded into the polyurethane-based matrix; wherein the overlay erosion and corrosion coating system has an enhanced particle erosion resistance.

In a third aspect, an overlay erosion and corrosion resistant coating system for protection of metal components from corrosion, erosion and fouling, said coating system comprising: a corrosion-resistant basecoat comprising a matrix formed by a hexavalent chromium-free, silicate-based binder filled with aluminum particles; a topcoat comprising a polyurethane-based matrix formed by polymerization of a polyol, a diol and a polyisocyanate; one or more metal oxide pigments embedded into the polyurethane-based matrix; wherein the overlay erosion and corrosion resistant coating system has an enhanced erosion resistance as measured by a Falling Sand method.

In a fourth aspect, an overlay erosion and corrosion resistant coating system for protection of metal components from corrosion, erosion and fouling, said coating comprising: a corrosion-resistant basecoat comprising a matrix formed by a chromate-phosphate based binder filled with aluminum particles; a topcoat comprising a polyurethane-based matrix; one or more metal oxide pigments embedded into the polyurethane-based matrix, said one or more metal oxide pigments having a pigment volume concentration (PVC) greater than 20 vol % and less than 60 vol % based on a total volume of the coating; wherein the overlay erosion and corrosion resistant coating has an enhanced particle erosion resistance as measured by a Falling Sand method.

In a fifth aspect, an overlay erosion and corrosion resistant coating system for protection of metal components from corrosion, erosion and fouling, said coating comprising: a corrosion-resistant basecoat comprising a matrix formed by a hexavalent chromium-free, silicate-based binder filled with aluminum particles; a topcoat comprising a polyurethane-based matrix; one or more metal oxide pigments embedded into the polyurethane-based matrix, said one or more metal oxide pigments having a pigment volume concentration (PVC) greater than 20 vol % and less than 60 vol % based on a total volume of the coating; wherein the overlay erosion and coating resistant system has an enhanced particle erosion resistance as measured by a Falling Sand method.

BRIEF DESCRIPTION OF THE DRAWINGS

The specification contains at least one photograph executed in color. Copies of this patent or patent publication with color photograph(s) will be provided by the Office upon request and payment of the necessary fee.

The objectives and advantages of the invention will be better understood from the following detailed description of the preferred embodiments thereof in connection with the accompanying figures wherein like numbers denote same features throughout and wherein:

FIGS. 3A, 3B, 3C, 3D, 3E and 3F show chemical schematics of representative polyols and polyisocyanates employed during the creation and evaluation of Formulations 1-22;

FIG. 8A represents test results for fluid resistance of the coating system after being immersed in. 0.5 wt. % Sulfuric acid $H_2SO_4$ (aq.) for 1000 hours, and FIG. 8B represents test results for fluid resistance of the coating system after being immersed in 5.0 wt. % sodium chloride NaCl (aq.) for 1000 hours.

DETAILED DESCRIPTION OF THE INVENTION

Figures 1A, 1B:
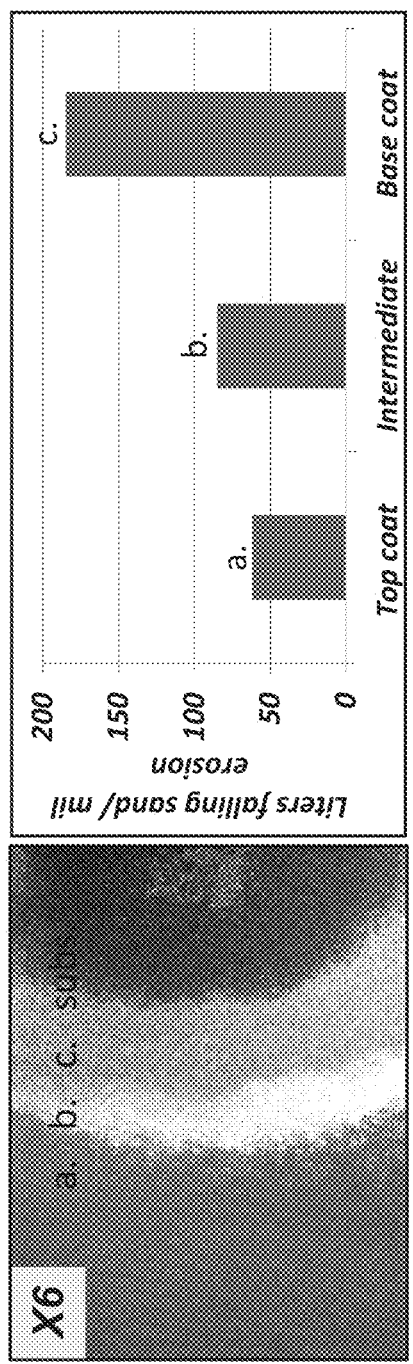
FIG. 1A shows a photograph of a commercially available SermaLon™ coating system having a topcoat ("a"), intermediate coat ("b") and base coat ("c") on a substrate ("subs")
FIG. 1B shows the corresponding erosion resistance rate for each of "a", "b" and "c" as measured by a standardized Falling Sand Method.

The relationship and functioning of the various elements of this invention are better understood by the following detailed description. However, the embodiments of this invention as described below are by way of example only. The detailed description contemplates the features, aspects and embodiments in various permutations and combinations, as being within the scope of the disclosure. The disclosure may therefore be specified as comprising, consisting or consisting essentially of, any of such combinations and permutations of these specific features, aspects, and embodiments, or a selected one or ones thereof.

"Equivalent weight" as used herein and throughout is a property of a material that allows the stoichiometry of a reaction to be converted into more easily measurable mass values and is defined as the molecular weight of a molecule divided by functionality, or number of reactive sites per molecule. For polymeric materials, the average molecular weight values are often used. Equivalent weight is an especially useful term for polyfunctional materials such as the polyols and polyisocyanates described herein. It should be understood that unless specified otherwise, all equivalent weights reported herein are without volatiles (e.g., solvent).

It should also be understood that all numerical values in Tables 1, 2, 3, and 4 (with the exception of erosion rate (L/min)) are expressed as wt. %. Specifically, for each Example Formulation, the polyol component is expressed as a wt. % based on a total weight of "total polyol"; the isocyanate component is expressed as a wt. % based on a total weight of "total isocyanate"; the pigment component is expressed as a wt. % based on a total weight of "total pigments". The sum of wt. % of "total polyol", "total isocyanate", "total pigments", "additives", and "solvents" equals 100 wt % for all Example Formulations.

Where a range of values describes a parameter, all sub-ranges, point values and endpoints within that range or defining a range are explicitly disclosed herein. All physical property, dimension, and ratio ranges and sub-ranges (including endpoints) between range end points for those properties, dimensions, and ratios are considered explicitly disclosed herein.

The "equivalents" in a system means the total number of a particular functional group contained in the molecules of a system. For example, the "equivalent isocyanate functional groups" means the total number of isocyanate functional groups ("NCO groups") in all molecules contained in the system. Additionally, the "equivalent alcohol functional groups" means the total number of alcohol functional groups ("OH groups") in all molecules contained in the system. As used herein and throughout, the terms "NCO/OH ratio" or "ratio" are intended to be used interchangeably to refer to the ratio of equivalent NCO groups to equivalent OH groups. The "equivalents" concept is useful for calculating stoichiometric ratios of functional groups, especially for polymeric materials.

Disclosed herein is a description of slurry compositions and coating compositions that can be used to provide protection against erosion, abrasion and wear to various substrates, including but not limited to underlay coatings such as basecoats or primers. The coating composition includes a solution of a polyurethane-based binder (or precursor) with dispersed particles of hard materials, which is capable of forming a cured coating or film on a surface and is furthermore capable of withstanding intermittent or continuous exposure to elevated temperatures, up to and including 482° F. (250° C.), without loss of adhesion or film continuity.

It has been found in the present invention that enhanced particle erosion resistance combined with enhanced heat resistance can be obtained in a polyurethane-based coating formulation through a specific combination of polyols, polyisocyanates and inorganic pigments. Unexpectedly, the inventors discovered that erosion resistance could be enhanced (i.e., increased) by at least 2-4 times or 3-4 times over existing SermaLon™ commercial coating systems while also maintaining acceptable film properties at temperatures of up to 482° F. It is rather unexpected for the polyurethane-based coating of the present invention to be suitable at the elevated service temperatures up to 482° F. that are often required for turbomachinery components. The inventors have concluded that none of the organic coating compositions described in the Background of the Invention can provide a combination of acceptable functional properties required for many of today's turbomachinery applications.

In accordance with one aspect of the present invention, a polyurethane—based multicomponent slurry composition comprises a branched polyester polyol of equivalent weight of 470-500 g/eq. OH, a polycarbonate diol of equivalent weight of 210-240 g/eq. OH, an aliphatic trimer of hexamethylene diisocyanate of equivalent weight of 260-290 g/eq. NCO and inorganic metal oxide pigments, whereby each of the pigments preferably has a Mohs hardness of greater than or equal to 6. Each of the components is employed in specific ratios sufficient to produce a coating layer with enhanced particle erosion resistance combined with enhanced heat resistance at elevated temperatures up to 482° F. The ratio of equivalent isocyanate functional groups to equivalent alcohol functional groups (NCO/OH) ranges from 1.0:1.6 to 1.6:1.0, with a preferred NCO/OH ratio ranging from 1.0:1.0 to 1.4:1.0 and a more preferred NCO/OH ratio ranging from 1.1:1.0 to 1.3:1.0.

In a second aspect, a coating composition for a substrate is provided. The coating composition comprises a polyurethane based matrix formed through a polymerization reaction of a branched polyester polyol of equivalent weight of 470-500 g/eq. OH; a polycarbonate diol of equivalent weight of 210-240 g/eq. OH; and an aliphatic trimer of hexamethylene diisocyanate of equivalent weight of 260-290 g/eq. NCO, wherein a ratio of equivalent isocyanate functional groups to equivalent alcohol functional groups (NCO/OH) ranges from 1.0:1.6 to 1.6:1.0, with a preferred NCO/OH ratio ranging from 1.0:1.0 to 1.4:1.0 and more preferred NCO/OH ratio ranging from 1.1:1.0 to 1.3:1.0. The polyurethane-based matrix is filled with inorganic metal oxide pigments, whereby each pigment preferably has a Mohs hardness of greater than or equal to 6. The resultant coatings provide an enhanced particle erosion resistance as demonstrated by the inventors in the working examples hereinbelow. Additionally, the resultant coatings exhibit heat resistance at elevated temperatures of up to 482° F., as also has been demonstrated by the inventors in the working examples hereinbelow.

In another aspect of the present invention, coating overlay systems are presented. The coating overlay system includes a topcoat layer that comprises a polyurethane based matrix formed through a polymerization reaction of a branched polyester polyol of equivalent weight of 470-500 g/eq. OH, a polycarbonate diol of equivalent weight of 210-240 g/eq. OH, an aliphatic trimer of hexamethylene diisocyanate of equivalent weight of 260-290 g/eq. NCO, wherein a ratio of equivalent weight isocyanate functional groups to equivalent alcohol functional groups (NCO/OH) ranges from 1.0:1.6 to 1.6:1.0, with a preferred NCO/OH ratio ranging from 1.0:1.0 to 1.4:1.0 NCO/OH ratio and a more preferred NCO/OH ratio ranging from 1.1:1.0 to 1.3:1.0. The polyurethane-based matrix is filled with inorganic metal oxide pigments, each preferably having a Mohs hardness of greater than or equal to 6. The topcoat layer provides an enhanced particle erosion resistance combined with enhanced heat resistance at elevated temperatures up to 482° F. The topcoat layer is applied on a corrosion-resistant aluminum matrix composite basecoat layer, in which the matrix of the basecoat is formed with a chromate-phosphate binder or hexavalent chromium-free silicate-based binders or other non-chrome containing binders.

A method for applying a coating is also provided that may include the application of the inventive coating formulation to substrates, parts, or onto a base coat layer, followed by drying and curing the coating to produce a solid cured coating.

The polymer can be either formed from a one-component solution, or formed from a multicomponent solution, such as a two-component solution comprised of a base component (such as a polyol) and a hardener component (such as a polyisocyanate) which react with each other upon mixing and/or upon curing to form a macromolecular polyurethane structure.

The polyurethane precursors utilized in the present invention can be either dissolved or otherwise dispersed in organic solvents or mixtures of organic solvents (solvent-borne) or dissolved or otherwise dispersed in water (water-borne), or may be solvent-less, not relying on either organic solvents or water as a carrier, or as a mixture of these.

The mechanism of cure can be such that the reactive components react spontaneously upon mixing, react with the aid of a catalyst, react in the presence of moisture, or react spontaneously upon thermal treatment above the temperature of mixing and or the temperature of application, or through a combination of any of these curing methods, (such as through both the aid of a catalyst, and a thermal cure). For a one-component system composed of a fully reacted polyurethane macromolecule, the cure mechanism may include a physico-chemical coalescence of individual polymeric molecules into a continuous film.

A polyol is defined as a reactant consisting of an organic material with multiple reactive sites of alcohol functional groups. In general, structural formulas of branched polyester polyols of the present invention can be represented by the structural formula as shown in FIG. 3A, and designated as "Polyol 1" which is also shown herein below:

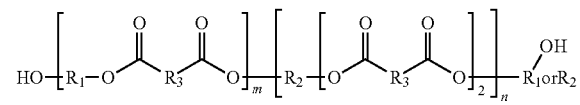

and polycarbonate diols structural formulas of the present invention can be represented by the structural formula as shown in FIG. 3C, and designated as "Polyol 4" which is also shown herein below:

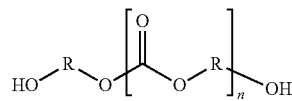

An isocyanate or a polyisocyanate is defined as a reactant typically consisting of an organic material with multiple reactive sites of isocyanate functional groups potentially including blocked isocyanate precursor functional groups. The polyisocyanate component must have a net average functionality greater than or equal to 2 in order to form macromolecular structures. The term "net average functionality" means the average number of functional groups per molecules in a mixture, such as the total number of alcohol functional groups divided by the total number of polyol molecules in a mixture of polyols of a system. The isocyanate component of the present invention can be represented by the following structural formula, designated as "Isocyanate 1", and is shown in FIG. 3D, which is also shown below:

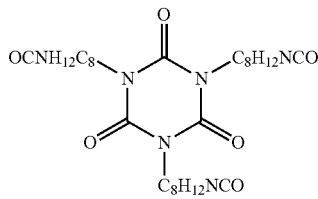

FIGS. 3A-3F show chemical schematics of representative polyols and polyisocyanates. In particular, FIG. 3A represents a branched polyester polyol as in Polyol 1 and Polyol 2. FIG. 3B represents the precursors used to generate an aliphatic polycarbonate polyester polyol as in Polyol 3. FIG. 3C represents a polycarbonate diol as in Polyol 4. FIG. 3D represents an aliphatic trimer of hexamethylene diisocyanate as in Isocyanate 1. FIG. 3E represents the precursors used to generate an aliphatic isocyanate as in Isocyanate 2. FIG. 3F represents a blocked isocyanate of hexamethylene diisocyanate as in Isocyanate 3. It should be understood that the terms "Polyol 1", "Polyol 2", "Polyol 3", "Polyol 4", "Isocyanate 1", "Isocyanate 2" and "Isocyanate 3" as shown in FIGS. 3A-3F, respectively, corresponds to the chemical structures used in the working examples and which are designated in Tables 1-4 for each of the tested Formulations. For example, Formulation 20 utilizes "Polyol 1" illustrated in FIG. 3A, "Polyol 4" illustrated in FIG. 3C, and "Isocyanate 1" illustrated in FIG. 3D.

The ratio of reactive functional groups relative to each other may also be modified in the final slurry formulation. For example, the ratio of equivalents of isocyanate functional groups, (or blocked isocyanate groups), to equivalents of alcohol functional groups (NCO/OH) used to form a polyurethane may range from 1.0:1.6 to 1.6:1.0. Preferably, the NCO/OH ratio ranges from 1.0:1.0 to 1.4:1.0, such that there is an excess in number of equivalent isocyanate functional groups relative to number of equivalent alcohol functional groups. More preferably, the NCO/OH ratio ranges from 1.1:1.0 to 1.3:1.0.

Pigments are defined as insoluble particles of inorganic matter dispersed or otherwise incorporated into a coating binder material to add further functionality to the binder portion of the coating. For the present invention, the functional pigments include but are not limited to those pigments utilized for chemical and corrosion resistance, hardness, and thermal stability. The pigments are generally composed of one or more metal oxide pigments. The pigments have an average particle size less than or equal to 15 microns, and more preferably less than or equal to 5 microns. Additionally, the pigments can be characterized by an aspect ratio ranging from 1 to 25. The pigments preferably have a Mohs hardness greater than or equal to 6. Furthermore, the pigments preferably exhibit thermal stability at temperatures greater than 500° F. and chemical stability toward organic solvents, water and strong acids having a pH of 1-2. It should be understood that the present invention also contemplates pigments besides metal oxides, such as, by way of example, ceramic-based or elemental based pigments.

The pigment volume concentration (PVC) is defined as the percent of total volume in the fully admixed and dried coating that is composed of insoluble pigment particles in the remainder of the coating matrix solids. The present invention has a PVC greater than 20 vol %, and less than 60 vol %, and more preferably ranging from 30 vol % and 50 vol %.

Customary additives to the coating formulation can be useful as well, including but not limited to pigment dispersants, surface leveling agents, wetting agents, viscosity/rheology modifiers, adhesion promoters, cure catalysts, pot-life extenders, nanoparticle dispersions, antioxidants, UV stabilizers and combinations of any of these additives.

It can be beneficial but not necessary to include such materials as metal flakes, metal particles, carbon particles, graphite, carbon nanotubes, graphene, and aluminum nitrides, boron nitrides or other such particles to increase heat conductivity and heat reflection to thus further improve the heat resistance of the entire coating system.

In the case of solvent-borne coatings, one or more solvents can be included at a level ranging from 0 to 40 wt. % of the total composition weight in the formulation of either the base component (i.e., polyol) or the hardener component (i.e., isocyanate) to provide solubility of binder components, enable mixing and adjust to an appropriate viscosity for the desired mode of coating application. Example solvents include but are not limited to aromatic solvents such as toluene, and xylene; ketone solvents such as methyl ethyl ketone, methyl isobutyl ketone, and cyclohexanone; and ester-containing solvents such as ethyl acetate, n-butyl acetate, t-butyl acetate, methoxypropyl acetate, and dimethyl carbonate; and/or any combination of such solvents.

The coating compositions of the present invention can be applied to a substrate or underlay coating by any number of conventional application techniques known in the art, such as by spraying, brushing, dip-spinning, etc. The coating can be applied in one or more coat applications to yield the desired dry film thickness. The coating of the present invention is generally applied to a dry film thickness of ranging from 0.5 to 3.0 mils, with a preferable thickness ranging from 1.0 to 2.0 mils (25 to 51 μm). The minimum thickness is determined by a need to provide a continuous layer covering a substrate. The maximum thickness of the basecoat layer is generally determined by a specified thickness of the entire multilayer overlay system. It is nevertheless customary and desirable not to apply a coating in excess of functional requirements for an application. For example, typical coating thicknesses for turbine compressor applications is less than or equal to 3 mils (76 μm), while on some components (such as, for example, compressor blades and vanes) the coating thickness should be typically less than or equal to 2 mils (51 μm).

The present invention appears as an opaque colored liquid material of appropriate viscosity for application. The potlife of the coating is defined as the period of time (at a given condition) between admixture of the components, and the time at which the cure of the coating has proceeded to too great a degree as to no longer be capable of application. It is preferred to have a potlife greater than 4 hours, and more preferable to have a potlife greater than 8 hours.

The coating comprises a colored, thin film coating which has a certain set of characteristics making it suitable for application within turbomachinery. These characteristics may include but are not limited to an average surface roughness ($R_A$) of less than 30 μinch (at a 0.030" cutoff); erosion resistance, as measured by the Falling Sand Erosion test, greater than or equal to commercially available topcoat for similar turbomachinery systems (such as Sennalon™); dry adhesion to either the substrate or the underlay coating; resistance to attack by immersion in chemicals such as solvents (as tested by Aromatic 100), strong acids (as tested by 0.1N sulfuric acid), and high ionic strength solutions (as tested by 5.0 wt % aqueous sodium chloride solution); resistance to elevated temperature water (at both 176° F. for 100 hours, and 212° F. for 10 minutes), salt spray corrosion resistance (as part of a coating system with anticorrosive basecoats and any appropriate intermediate coatings, as described above). Furthermore, the coating is capable of maintaining acceptable film characteristics when further cured at elevated temperatures up to 392° F. and 482° F.

Not to be bound by any theory, the inventors suggest that the thermal stability of the coating can be occurring as a result of a beneficial and synergistic combination of certain polyol components, enabling a maximum of flexibility, which is maintained at elevated temperatures, partially through delaying decomposition reactions to a sufficient degree to maintain acceptable film properties. The addition of other components, such as pigments, especially those which can absorb or reflect detrimental wavelengths, or reflect or conduct heat from the coating; and especially additives that can chemically mitigate the effects of thermal oxidation and thermolysis can also benefit thermal stability.

The result of relatively high thermal stability is unexpected. In particular, the inventors have observed discoloration of the binder portion of the coating, indicating chemical changes such as oxidation, but there does not appear to be a major weight change, by way of either a loss or gain, associated with the reaction. Additionally, there does not appear to be a loss of molecular weight as evidenced by the loss of mechanical properties, cracking, or loss of adhesion.

Again, without being bound by any theory, the erosion resistance of the coating may be the result of the dual effects of the flexibility and abrasion resistance of the polyurethane binder component, and the hardness and small particle sizes of the pigments which are embedded therewithin. The flexible binder enables energy damping of the impacting material, and the hard small pigment particles add resistance to cracking in the binder by increasing the composite hardness of the coating, by limiting crack propagation within the binder, and by limiting the volume of erosive material loss from the coating with each impact by decreasing the volume of both the individual pigment particles and the individual polymeric domains in the interstitial spaces between these particle spaces.

Figure 2:
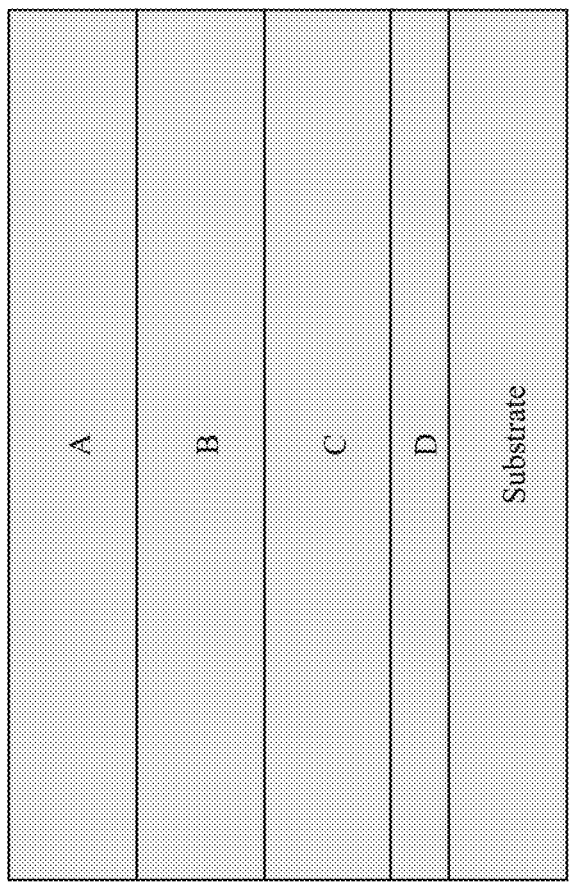
FIG. 2 shows a schematic of the coating stack-up configuration in accordance with one embodiment of the present invention, whereby layer "A" is the erosion resistant topcoat, layer "B" is an optional intermediate coat, layer "C" is an optional pretreatment and layer "D" is the corrosion resistant basecoat.

One example of the general coating configuration of the present invention will now be described. The topcoat "A" (FIG. 2) is a component of a multilayer overlay coating system comprised of a corrosion-resistant basecoat "D" (FIG. 2) applied directly to a metallic substrate or to a metallic substrate which has been prepared through the application of a pretreatment layer "B" (FIG. 2), and optionally, an intermediate coating or multiple intermediate coats "C" (FIG. 2) that can be applied between the basecoat "D" and the topcoat "A". The basecoat "D" may be comprised of either a chromated (Cr(VI)-containing) material, or a non-chromated (Cr(VI)-free) ceramic binder. For example, the basecoat "D" may be a Cr(VI)-containing material as described in the Allen patent, which is incorporated by reference herein in its entirety; or the basecoat "D" may comprise a Cr(VI)-free containing material as described in the Belov Patents ("Chromate-Free Silicate Based Ceramic Compositions"), which are incorporated herein by reference in their respective entireties, or in U.S. patent application Ser. No. 16/163,893 ("Chromium-Free Silicate-Based Ceramic Compositions With Reduced Curing Temperature"), which is incorporated herein by reference in its entirety. Applicants have demonstrated successful compatibility and performance with such chromated, and non-chromated anti-corrosive basecoats.

The basecoat preferably comprises aluminum or aluminum alloy particles incorporated into a binder, wherein the aluminum or aluminum alloy particles comprises a particle size distribution characterized in that the $50^{th}$ percentile of the particle size distribution has a diameter of between about 4 to 7 microns and the $90^{th}$ percentile of the particle size distribution has a diameter of less than or equal to about 11.5-15.5 microns. Additionally, the basecoat can further comprise zinc-containing particles embedded within said matrix. Still further, the basecoat is corrosion-resistant and comprises a matrix formed by a hexavalent chromium-free, silicate-based binder filled with aluminum particles.

In the course of developing the formulations of the present invention, the inventors extensively screened a significant number of different Formulations 1-22, which are provided below. Each of the coatings in the Examples below were applied onto respective substrates and cured thermally at temperatures ranging from 140° F. and 482° F. Specifically, panels of low-carbon 1010 steel were initially surface treated by grit-blasting with 100 mesh grit. The corrosion resistant basecoat was then sprayed onto the panels and cured to form a base coating layer. The basecoat utilized was SermeTel™ 1460 (i.e., a chromate-phosphate binder with aluminum-containing powder) for all the Examples, with the exception of the test in FIG. 5b, which used a hexavalent-chrome free basecoat, as described in the Belov patents. An optional intermediate coat was spray applied in two coats to the fully cured basecoat, at a dry film thickness of mils, allowed to flash at room temperature for 5-15 minutes and then cured at 175° F. for 15 minutes. The topcoat was then applied in two coats to the partially cured intermediate coat at a dry film thickness of 1.3-2.0 mils, allowed to flash at room temperature for 30 minutes, then cured at 175° F. for 30 minutes, and 325° F. for 60 minutes.

Mechanical and functional properties of the prepared coatings were tested as follows. Coatings adhesion to a substrate and inter-layer adhesion were tested by cross-hatch tape (per ASTM D3359) and bend tests. In accordance with ASTM D3359 test method, a crosscut grid of scribe lines 2 mm apart was cut into the coating through to the substrate and standard adhesive tape was applied to the grid and peeled back at a 180° angle. Adhesion was determined by the amount of coating removed by the tape. The cross-hatch region was evaluated with optical microscope (6× magnification). In the bend test, 90° bend of a coated panel around a 0.22" diameter mandrel was performed followed by evaluation of the area around the bend for any defects such as cracking, peeling or delamination.

The surface roughness ($R_A$) of the coating was tested utilizing a contact profilometer with a 0.030 inch cutoff.

Salt Spray testing of scribed coated panels was performed per ASTM B117 for at least 1000 hours, and in some cases, over 1500 hours.

Heat resistance of the coated panels was tested at 200° C. (390° F.) for 20 hours, and at 250° C. (482° F.) for 4 hours and for 20 hours. The panels were examined for coating failure, color change, gloss change, surface roughness and loss of adhesion With regards to the boiling water resistance test, coated panels were placed in boiling water for 10 min, then cooled and air-dried for a minimum of 3 hours, followed by cross-hatch and bend adhesion tests performed as described above.

Hot water resistance was also performed by immersing coated panels in water held at 176° F. for 100 hours, then cooled, dried and examined for film failures and loss of adhesion.

The solvent resistance test was performed on coated panels immersed in Aromatic 100 for 200 hours at room temperature, followed by cross-hatch and bend adhesion tests performed as described above and examined for film failures and loss of adhesion.

The humidity resistance testing was performed in accordance to ASTM D2247 for 500 hours and examined for film failures and loss of adhesion.

Resistance to sulfuric acid was performed by immersing coated panels in 0.5 wt. % aqueous sulfuric acid solution for 1000 hours at room temperature then removed, dried and examined for film failures and loss of adhesion.

Resistance to sodium chloride was performed by immersing coated panels in 5 wt. % aqueous sodium chloride solution for 1000 hours at room temperature then removed, dried and examined for film failures and loss of adhesion.

Erosion testing was performed using a falling sand erosion rig according to ASTM D968-17, Method A and ASTM C778 20-30 relating to standard Ottawa sand monitoring film loss measured both visually and with a film thickness gauge. The volume of falling sand is related to the loss of film thickness at the point of lowest film thickness that develops in the wear mark on the coating as the erosion occurs. The wear marks were examined with optical microscopy. The term "Falling Sand Erosion Rate" as used herein and throughout refers to the erosion resistance rate as measured by the falling sand ASTM methods and techniques listed hereinabove ("Falling Sand" method). Generally speaking, a larger volume of sand required to erode film thickness means higher erosion resistance. A higher erosion resistance rate (L of falling sand onto the coating or film per mil of coating or film thickness loss) means a higher Falling Sand Erosion number. Accordingly, the terms "erosion rate", "erosion resistance rate" and "Falling Sand Erosion" are used herein and throughout interchangeably.

As will be described in detail below, the coatings having Example Formulations 1-22 were produced, cured and applied as described herein, and then their respective erosion resistance rate was subsequently tested as described herein. The falling sand erosion resistance was measured for each of the Example Formulations 1-22 and reported in units of liters of sand per mil of coating loss at breakthrough of the topcoat. The erosion resistance results were then compared against those of the topcoat in the SermaLon™ system, as shown in FIG. 1b. SermaLon™ was deemed a suitable point for comparison, as it is currently used in the industry and generally represents the benchmark for erosion resistance. The average surface roughness ($R_A$) of the coatings was also measured for each of these coatings with Example Formulations 1-22 and are listed in Table 5. As demonstrated below, improvements to erosion resistance were evidenced in many of the Example Formulations 1-22. The effects of each of the variables: polyol composition, isocyanate composition, and pigment composition were determined to be significant, and specific combinations of these variables were shown to be synergistic.

While the preferred embodiments of the inventive coating and slurry formulations have been set forth above, the following examples were carried out to evaluate various mechanical and functional properties and are intended to provide a basis for better understanding of properties and functions of the present invention coatings, as well as to demonstrate that said coatings perform on par with the benchmark commercially available coatings, such as SermaLon™. The following examples are not to be construed as limiting the invention. The coatings were applied and cured as described hereinabove.

EXAMPLES

Liquid coatings of Example Formulations 1, 2, 3, and 4 were produced. The example liquid coatings were comprised of a two-component system. The base components were comprised of specific amounts and types of solutions of different polyols, pigments, solvents and other additives as shown in Table 1. Table 1 provides a tabular summary of each of the Example Formulations 1-4 that were tested. Each Example Formulation consisted of a certain weight percentage of one or more Polyols 1-3; Isocyanates 1-3; Pigments 1-3; additives and solvents. The curative component was comprised of specific amounts of solutions of polyisocyanates as also shown in Table 1. The curative and base were admixed to yield a ratio of 1.2 eq isocyanate to 1.0 eq. alcohol. In the experiments of Table 1, the composition of Isocyanate 1, Isocyanate 2 and Isocyanate 3 were controllably varied. The polyol compositions (34 wt. % Polyol 1, 35 wt. % Polyol 2, 31 wt. % Polyol 3) were each held constant. In other words, the weight percentage of Polyol 1 based on a total polyol weight remained at 34 wt. % for Example Formulations 1-4; the weight percentage of Polyol 2 based on a total polyol weight remained at 35 wt. % for Example Formulations 1-4, and the weight percentage of Polyol 3 based on a total polyol weight remained at 31 wt. % for Example Formulations 1-4. Similarly, the ratios of individual pigments (29 wt. % Pigment 1, 40 wt. % Pigment 2, 31 wt. % Pigment 3) and PVC (32-36 vol %) were each held constant for Example Formulations 1-4. It should be understood that the other tests which make reference to certain compositions being held constant have the same meaning as described hereinabove.

Polyol 1 was a branched polyester polyol of equivalent weight of 470-500 g/eq. OH (as illustrated in FIG. 3A) commercially obtained from Covestro under the trademark Desmophen™ 670 BA. Polyol 2 was a branched polyester polyol of equivalent weight of 295-325 g/eq. OH (as illustrated in FIG. 3A), commercially obtained from Covestro under the trademark Desmophen™ 651 MPA. Polyol 3 was a linear aliphatic polycarbonate polyester of equivalent weight of 500-530 g/eq. OH (as the product from the reaction illustrated in FIG. 3B) commercially obtained from Covestro under the trademark Desmophen™ C 1100. Isocyanate 1 was an aliphatic trimer of hexamethylene diisocyanate of equivalent weight of 260-290 g/eq NCO (as illustrated in FIG. 3D) commercially obtained from Covestro under the trademark Desmodur™ N 3580 BA. Isocyanate 2 was an aliphatic polyisocyanate of equivalent weight of 370-400 g/eq NCO (as the product from the reaction illustrated in FIG. 3E), commercially obtained from Covestro under the trademark Desmodur® N3800. Isocyanate 3 was a blocked aliphatic polyisocyanate (hexamethylene diisocyanate homopolymer) of equivalent weight of 360-390 g/eq NCO (as illustrated in FIG. 3F) commercially obtained from Vencorex under the trademark Tolonate™ D2. Pigment 1 was a silica alumina ceramic with average particle size of 5 microns, and Mohs hardness 7. Pigment 2 was a Cobalt Chrome spinel with average particle size of 1 micron, and Mohs hardness 8. Pigment 3 was an alumina silicate with average particle size of 2.5 microns, and Mohs hardness 6.

The erosion resistance of each of the Example Formulations 1-4 was determined by erosion testing as described hereinabove. The results are shown in Table 1. None of the Example Formulations 1-4 had an erosion resistance significantly improved relative to the topcoat in the conventional SermaLon™ (i.e., SermeTel™ 1140 topcoat) system as shown in FIG. 1b. FIG. 1b indicates that the topcoat in SennaLon™ has a Falling Sand Erosion Rate of 62; and the Example Formulations 1-4 had Falling Sand Erosion Rates ranging from between 54-76. The inventors noted that the specific isocyanate fraction had a significant effect on the erosion resistance rate of the final coating. It was also noted that the blocked Isocyanate 3 performed considerably worse than Isocyanate 1 and Isocyanate 2.

TABLE 1

Comparative Example Formulations 1-4 weight percent compositions based on total coating weight (non-volatile contents shown for polyols and isocyanates)

| Example formulation | 1 | 2 | 3 | 4 |
|---|---|---|---|---|
| Polyol 1 | 6.3 | 6.2 | 6.1 | 5.8 |
| Polyol 2 | 6.5 | 6.4 | 6.3 | 6.0 |
| Polyol 3 | 5.7 | 5.6 | 5.5 | 5.3 |
| total polyol | 18.4 | 18.2 | 17.8 | 17.2 |
| Isocyanate 1 | 15.5 | 13.0 | 7.5 | 0.0 |
| Isocyanate 2 | 0.0 | 4.0 | 0.0 | 0.0 |
| Isocyanate 3 | 0.0 | 0.0 | 9.6 | 18.6 |
| total isocyanate | 15.5 | 17.0 | 17.1 | 18.6 |
| Pigment 1 | 9.3 | 9.2 | 9.0 | 8.7 |
| Pigment 2 | 12.7 | 12.6 | 12.3 | 11.9 |
| Pigment 3 | 9.9 | 9.8 | 9.5 | 9.2 |
| total pigments | 31.9 | 31.5 | 30.8 | 29.8 |
| additives | 2.91 | 2.87 | 2.80 | 2.71 |
| solvents | 31.28 | 30.35 | 31.53 | 31.76 |
| Erosion resistance rate (L/mil) | 65 | 76 | 56 | 54 |

In another experiment, Example Formulations 5, 6, 7, 8, 9, 10, and 11 were produced as shown in Table 2. The example liquid coatings were comprised of a two-component system. The base components were comprised of specific amounts and types of solutions of different polyols, pigments, solvents and other additives as shown in Table 2. Table 2 provides a tabular summary of each of the Example Formulations 5-11 that were tested. Each Example Formulation 5-11 consisted of a certain weight percentage of one or more Polyols 1-3; Isocyanate 1; Pigments 1-3; additives and solvents. The curative component was comprised of a specific amount and type of solution of an aliphatic polyisocyanate. The two components were admixed to yield a stoichiometric ratio of 1.2 eq isocyanate to 1.0 eq. alcohol. In this experiment, the polyol compositions were controllably varied and PVC varied dependently (28-46%). The isocyanate compositions (100% Isocyanate 1), and the ratios of individual pigments (29 wt. % Pigment 1, 40 wt. % Pigment 2, 31 wt. % Pigment 3) were each held constant for Example Formulations 5-11. All other polyols, isocyanates and pigments were as described previously. The erosion resistance rate of each of the Example Formulations 5-11 was determined by erosion testing as described hereinabove. The results are shown in Table 2. It was observed that the erosion rate was affected by the relative composition of the polyol components. The inclusion of Polyol 2 had a negative effect on the erosion resistance rates of every system in which it was included. With regards to Formulations 5-11 of Table 2, the erosion resistance rates were determined to be highest in those systems with Polyol 3, Polyol 1+Polyol 3, and Polyol 1 respectively, all of which had higher Falling Sand Erosion Rates in comparison to the topcoat in the conventional SermaLon™ (SermeTel™ 1140) system as shown in FIG. 1b. FIG. 1b indicates that the topcoat in SermaLon™ has a Falling Sand Erosion Rate of 62.

TABLE 2

Example Formulation 5-11 weight percent compositions based on total coating weight (non-volatile contents shown for polyols and isocyanates)

| Example formulation | 5 | 6 | 7 | 8 | 9 | 10 | 11 |
|---|---|---|---|---|---|---|---|
| Polyol 1 | 0.0 | 0.0 | 19.5 | 0.0 | 8.7 | 10.4 | 6.3 |
| Polyol 2 | 16.2 | 0.0 | 0.0 | 9.5 | 9.0 | 0.0 | 6.5 |
| Polyol 3 | 0.0 | 20.4 | 0.0 | 8.4 | 0.0 | 9.5 | 5.7 |
| total polyol | 16.2 | 20.4 | 19.5 | 17.9 | 17.6 | 19.9 | 18.4 |
| Isocyanate 1 | 21.0 | 10.4 | 13.2 | 16.7 | 17.5 | 11.9 | 15.5 |
| total isocyanate | 21.0 | 10.4 | 13.2 | 16.7 | 17.5 | 11.9 | 15.5 |
| Pigment 1 | 7.9 | 10.9 | 9.6 | 9.1 | 8.7 | 10.2 | 9.3 |
| Pigment 2 | 10.8 | 14.9 | 13.2 | 12.5 | 11.9 | 14.0 | 12.7 |
| Pigment 3 | 8.4 | 11.6 | 10.2 | 9.7 | 9.2 | 10.9 | 9.9 |
| total pigments | 27.1 | 37.4 | 33.0 | 31.3 | 29.7 | 35.1 | 31.9 |
| additives | 2.56 | 3.31 | 2.98 | 2.87 | 2.74 | 3.13 | 2.90 |
| solvents | 33.18 | 28.43 | 31.33 | 31.23 | 32.36 | 29.99 | 31.27 |
| Erosion resistance rate (L/mil) | 62 | 143 | 98 | 63 | 59 | 125 | 68 |

In another experiment, Example Formulations 12, 13, and 14 were produced as shown in Table 3. The liquid coatings were comprised of a two-component system. The base components were comprised of specific amounts and types of solutions of different polyols, pigments, solvents and other additives as shown in Table 3. Table 3 provides a tabular summary of each of the Example Formulations 12-14 that were tested. Each of the Example Formulations 12-14 consisted of a certain weight percentage of one or more Polyols 3 and 4; Isocyanates 1 and 2; Pigments 1, 2, 4, 5 and 6; additives and solvents. The curative component was comprised of specific amounts and types of solutions of polyisocyanates as shown. The two components were admixed to yield a ratio of 1.2 eq isocyanate to 1.0 eq. alcohol. In this experiment, the polyol compositions were controllably varied, and the PVC varied dependently (32-44%). The isocyanate compositions (76 wt. % Isocyanate 1, 24 wt. % Isocyanate 2), and pigment compositions (22 wt. % Pigment 1, 16 wt. % Pigment 2, 35 wt. % Pigment 4, 2 wt. % Pigment 5, 25 wt. % Pigment 6) were held constant for Example Formulations 12, 13 and 14. The ratios of individual pigments were controllably varied. Polyol 4 was a polycarbonate diol of equivalent weight of 210-240 g/eq. OH (as illustrated in FIG. 3C), commercially obtained as UBE Eternacoll PH50. Pigment 4 was an alpha-alumina with an average particle size of 5 microns, and Mohs hardness 9. Pigment 5 was a silica coated rutile titanium dioxide with an average particle size of 0.4 micron, and Mohs hardness 6.5-7. Pigment 6 was a platy silica with an average particle size of 3-5 micron, and Mohs hardness 7. All other polyols, isocyanates and pigments are as described previously. The erosion resistance rate of each of the Example Formulations 12, 13 and 14 was determined by erosion testing as described hereinabove. The results are shown in Table 3. Similar to other tests, the variation of the polyol compositions were shown to have significant effects on the erosion rate of the coatings. In particular, a different combination of polyols (i.e., Polyols 3 and 4) for each of Example formulations 12, 13 and 14 is believed to have contributed to the resultant erosion rate. Here, the Polyols 3 and 4 were incorporated with Isocyanate 2 and a combination of different pigments. The addition of Isocyanate 2 was shown to have a small beneficial effect on the erosion rate in comparison to the erosion rates of the Formulations 5-11 listed in Table 2. Generally speaking, the erosion resistance rates for Example Formulations 12, 13 and 14 were significantly improved over the topcoat of conventional SermaLon™ (SermeTel™ 1140) as shown in FIG. 1b.

TABLE 3

Example Formulation 12-14 weight percent compositions based on total coating weight (non-volatile contents shown for polyols and isocyanates)

| Example formulation | 12 | 13 | 14 |
|---|---|---|---|
| Polyol 3 | 0.0 | 21.5 | 10.0 |
| Polyol 4 | 18.6 | 0.0 | 10.0 |
| total polyol | 18.6 | 21.5 | 20.0 |
| Isocyanate 1 | 16.6 | 9.3 | 13.2 |
| Isocyanate 2 | 5.1 | 2.9 | 4.1 |
| total isocyanate | 21.7 | 12.2 | 17.3 |
| Pigment 1 | 7.9 | 9.1 | 8.5 |
| Pigment 2 | 5.8 | 6.7 | 6.3 |
| Pigment 4 | 12.4 | 14.3 | 13.3 |
| Pigment 5 | 0.6 | 0.7 | 0.6 |
| Pigment 6 | 8.9 | 10.3 | 9.5 |
| total pigments | 35.6 | 41.1 | 38.2 |
| additives | 3.76 | 4.26 | 4.00 |
| solvents | 20.37 | 20.89 | 20.62 |
| Erosion rate (L/mil) | 159 | 132 | 148 |

In another experiment, Example Formulations 15, 16, 17, 18, 19, 21 and 22 were produced as shown in Table 4. Each Example Formulation consisted of a certain weight percentage of Polyols 1 and 4; Isocyanate 1; Pigments 1, 2, 3, 4, 5, and 7; additives and solvents. The liquid coatings were comprised of a two-component system. The base components were comprised of a specific amount and type of mixtures of different polyols, pigments, solvents and other additives as shown in Table 4. The curative component was comprised of a specific amount and type of solution of an aliphatic polyisocyanate (Isocyanate 1). The Isocyanate 1 and Polyols 1 and 4 were admixed to yield a ratio of 1.2 eq isocyanate to 1.0 eq. alcohol. The polyol compositions for Formulations 15-19 and 21-22 were held constant at 17-19 wt. % (composed of wt. % Polyol 1 and 64-65 wt. % Polyol 4). Formulation 20 had a polyol composition of 50 wt. % Polyol 1 and 50 wt. % Polyol 4. The isocyanate composition at 16-18 wt. %, and the PVC at 35-36% were held constant for Example Formulations 15-22. The ratios of individual pigments were controllably varied. Pigment 7 was a manganese ferrite with average particle size of 0.6 microns, and Mohs hardness 7-8. All other polyols, isocyanates and pigments were as described previously. The erosion resistance rate of each of the Example Formulations 15-19 was determined by erosion testing as described hereinabove. The results are shown in Table 4. It is shown here that the erosion rate was dependent, at least in part, upon the composition of the pigment fraction of coating. The erosion rate with this combination of Polyols 1 and 4 was greatly improved in comparison to the topcoat of conventional SermaLon™ (SermeTel™ 1140) as shown in FIG. 1b. Many of the Formulations in Table 4 displayed the highest erosion resistance rates of all the Formulations tested, as shown in Table which provides a tabular snapshot of all Example Formulations along with their surface roughness. The mass ratio of Polyol 4 to Polyol 1 was approximately 1.7:1 or greater, and preferably, approximately 1.7:1 up to about 2:1. Applicants have concluded that the relative amounts of Polyols in the Formulations allowed optimization of erosion resistance while maintaining film properties such as those tested below and illustrated in FIGS. 4a, 4b, 5a, 5b, 6a, 6b, 7a, 7b, 8a and 8b.

Additionally, contrary to Formulations 1-20, Formulations 21 and 22 utilized additional anti-oxidant based additives for the polyurethane matrix at elevated temperatures. The anti-oxidant utilized in Formulation 21 was commercially obtained from Clariant under the trademark Hostavin™ 3070P, and the anti-oxidant utilized in Formulation 22 was commercially obtained from Clariant under the trademark Addworks™ IBC251. In both instances, the anti-oxidant additives comprised up to about 1 wt % based on a total weight of the Formulation.

TABLE 4

Example Formulations 15-22, weight percent compositions based on total coating weight (non-volatile contents shown for polyols and isocyanates)

| Example Formulation | 15 | 16 | 17 | 18 | 19 | 20 | 21 | 22 |
|---|---|---|---|---|---|---|---|---|
| Polyol 1 | 6.6 | 6.9 | 6.4 | 6.8 | 6.3 | 8.6 | 6.3 | 6.2 |
| Polyol 4 | 11.8 | 12.3 | 11.5 | 12.2 | 11.3 | 8.7 | 11.2 | 11.1 |
| total polyol | 18.4 | 19.3 | 17.9 | 19.0 | 17.5 | 17.3 | 17.5 | 17.3 |
| Isocyanate 1 | 16.8 | 17.6 | 16.4 | 17.3 | 16.1 | 14.9 | 16.0 | 15.8 |
| total isocyanate | 16.8 | 17.6 | 16.4 | 17.3 | 16.1 | 14.9 | 16.0 | 15.8 |
| Pigment 1 | 15.1 | 19.8 | 10.2 | 9.9 | 10.2 | 0.0 | 0.0 | 0.0 |
| Pigment 2 | 20.6 | 13.5 | 13.9 | 13.6 | 14.0 | 6.8 | 6.8 | 6.7 |
| Pigment 3 | 0.0 | 0.0 | 0.0 | 10.6 | 0.0 | 0.0 | 0.0 | 0.0 |
| Pigment 4 | 0.0 | 0.0 | 13.0 | 0.0 | 0.0 | 33.8 | 33.9 | 33.6 |
| Pigment 5 | 0.0 | 0.0 | 0.0 | 0.0 | 0.0 | 0.7 | 0.7 | 0.7 |
| Pigment 7 | 0.0 | 0.0 | 0.0 | 0.0 | 13.9 | 0.0 | 0.0 | 0.0 |
| total pigments | 35.7 | 33.3 | 37.1 | 34.1 | 38.1 | 41.3 | 41.4 | 41.0 |
| additives | 6.8 | 6.8 | 6.8 | 6.8 | 6.8 | 51 | 4.8 | 5.8 |
| solvents | 22.3 | 23.1 | 21.9 | 22.8 | 21.5 | 21.5 | 20.4 | 20.1 |
| Erosion rate (L/mil) | 276 | 206 | 276 | 227 | 240 | 89 | 160 | 162 |

TABLE 5

Falling sand erosion resistance, and average surface roughness Ra at 140° F., and 482° F. cure temperatures.

| | $R_A$ (@ 140 F.) | $R_A$ (@ 482° F.) | Falling Sand Erosion |
|---|---|---|---|
| SermaLon (SermeTel ™ 1140 topcoat) | 36-40 | | 62 |
| 1 | 9.9 | 19.50 | 65 |
| 2 | 11.2 | 18.73 | 76 |

TABLE 5-continued

Falling sand erosion resistance, and average surface roughness Ra at 140° F., and 482° F. cure temperatures.

| | $R_A$ (@ 140 F.) | $R_A$ (@ 482° F.) | Falling Sand Erosion |
|---|---|---|---|
| 3 | 17.5 | 26.72 | 56 |
| 4 | 29.8 | 32.93 | 54 |
| 5 | 14.0 | 21.2 | 62 |
| 6 | 21.3 | 30.5 | 143 |
| 7 | 19.8 | 32.9 | 98 |
| 8 | 19.8 | 30.1 | 63 |
| 9 | 20.0 | 33.1 | 59 |
| 10 | 22.1 | 33.5 | 125 |
| 11 | 23.8 | 35.8 | 68 |
| 12 | 20.4 | 36.8 | 159 |
| 13 | 22.9 | 37.3 | 132 |
| 14 | 21.8 | 37.7 | 148 |
| 15 | 31.5 | 30.9 | 276 |
| 16 | 41.6 | 39.8 | 206 |
| 17 | 36.3 | 31.1 | 276 |
| 18 | 35.9 | 35.4 | 227 |
| 19 | 33.6 | 32.1 | 240 |
| 20 | 25.0 | 30.2 | 89 |
| 21 | 14.2 | 22.8 | 160 |
| 22 | 29.7 | 28.6 | 162 |

As can be seen in Table 5, many of the tested Formulations in accordance with the present invention represented a significant improvement in erosion resistance over the benchmark coating system of SermaLon.

Next, a variety of coating tests were carried out utilizing Example Formulation 20 to enable comparison against the commercially available reference coating, SermaLon™ (i.e., SermeTel™ 1140 as the topcoat, SermeTel™ 1183 as intermediate and SermeTel™ 1460 as basecoat), which represents the benchmark for commercially available corrosion protection coating systems. The liquid coating was comprised of a two-component system consisting of a base component and a curative component. The base component was comprised of solutions of one or more different polyols, pigments, solvents and other additives as shown in Table 4. The curative component was comprised of a solution of polyisocyanate as shown. The two components were admixed to yield a ratio of 1.2 eq isocyanate to 1.0 eq. alcohol. In this experiment, the polyol compositions (50 wt. % Polyol 1, 50 wt. % Polyol 4), isocyanate compositions (100 wt. % Isocyanate 1), pigment compositions (16 wt. % Pigment 2, 82 wt. % Pigment 4, 2 wt. % Pigment 5) and the PVC (36-37) were based on advantageous results from previous experiments. All polyols, isocyanates and pigments are as described previously.

Figures 4A, 4B:
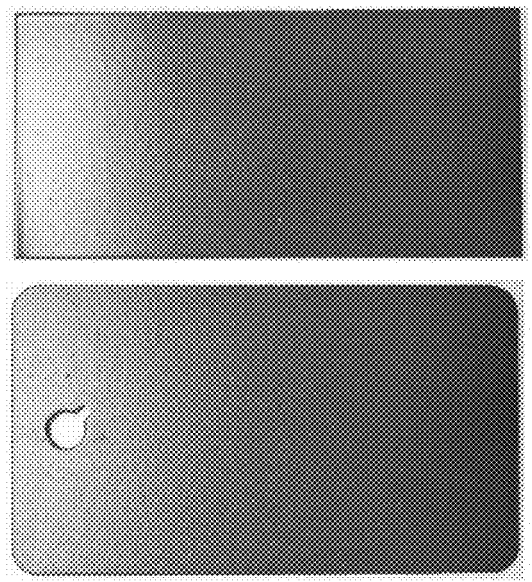
FIG. 4A shows photographs of coated panels of Example Formulation 20 topcoat with an optional polyurethane-based intermediate coat and chrome-containing SermeTel™ 1460 basecoat that was tested for 100 hours immersion in 176° F. water in accordance with the principles of the present invention.
FIG. 4B shows photographs of coated panels of another coating system that includes the Example Formulation 20 topcoat with an optional polyamideimide-based intermediate coat chrome-containing SermeTel™ 1460 basecoat that was tested for 100 hours immersion in 176° F. water.

FIGS. 4a and 4b show excellent resistance of the coating system of Example Formulation 20 was achieved after having been immersed for 100 hours in water at 176° F. in accordance with the hot water resistance test. The SermaLon™ coating system did not pass this hot water immersion test.

Figure 5B:
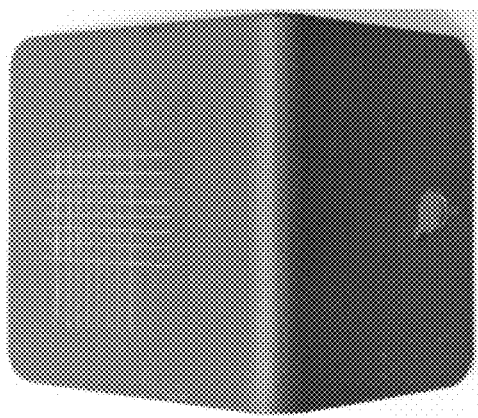
FIGS. 5A and 5B shows photographs of coated panels of Example Formulation 20 tested for 10 minutes immersion in boiling water where Example Formulation 20 in FIG. 5a was applied as a topcoat over a chromated basecoat and where Example Formulation 20 in FIG. 5b was applied as a topcoat over a non-chromated basecoat, respectively, in accordance with the principles of the present invention.
Figure 5A:
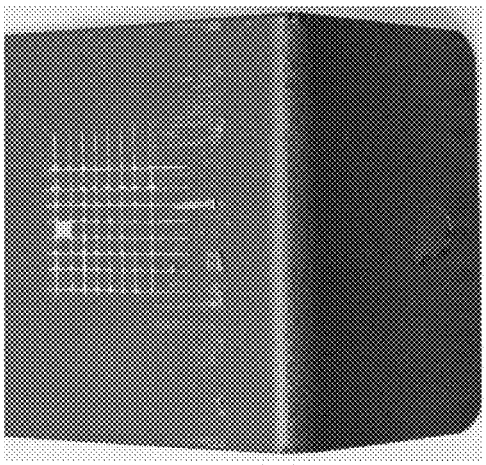

FIG. 5a shows photographs of the coated panels of a coating system comprising Example Formulation 20 after immersion in boiling water. The boiling water exposure test was a more aggressive test than the hot water test and was therefore performed for ten minutes. The coated panel of FIG. 5a represented a topcoat of Example Formulation 20 on top of a chromated basecoat. The exposure to boiling water was intended to uncover any weaknesses in coating adhesion or integrity during the ten-minute test period. The results in FIG. 5a indicate that the coating system of Example Formulation 20 exhibited excellent resistance to immersion in the boiling water.

FIG. 5b shows photographs of the coated panels of another coating system comprising Example Formulation 20 after immersion in boiling water for ten minutes. The coated panel of FIG. 5b represented a topcoat of Example Formulation 20 over a non-chromated basecoat commercially that is available as CF7800 ™ by Praxair Surface Technologies, Inc. (Indianapolis, IN), and which is described in the Belov Patents. The results in FIG. 5b indicate that the coating system of Example Formulation 20 exhibited excellent resistance to immersion in the boiling water. Collectively, the test results of FIGS. 5a and 5b demonstrate the adhesion compatibility of the coating overlay systems consisting of Example Formulation 20 with chromated and non-chromated basecoats, respectively, as well as its ability to resist attack to boiling water.

Figure 6A:
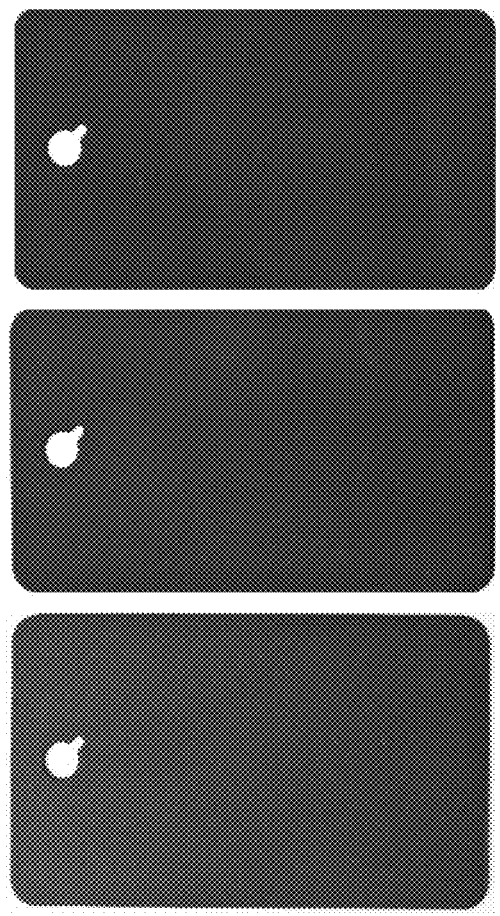
FIG. 6A shows photographs of three coated panels of Example Formulation 20 tested for heat resistance at 392° F. for 20 hours, 482° F. for 4 hours, and 482° F. for 20 hours, respectively, in accordance with the principles of the present invention.
Figure 6B:
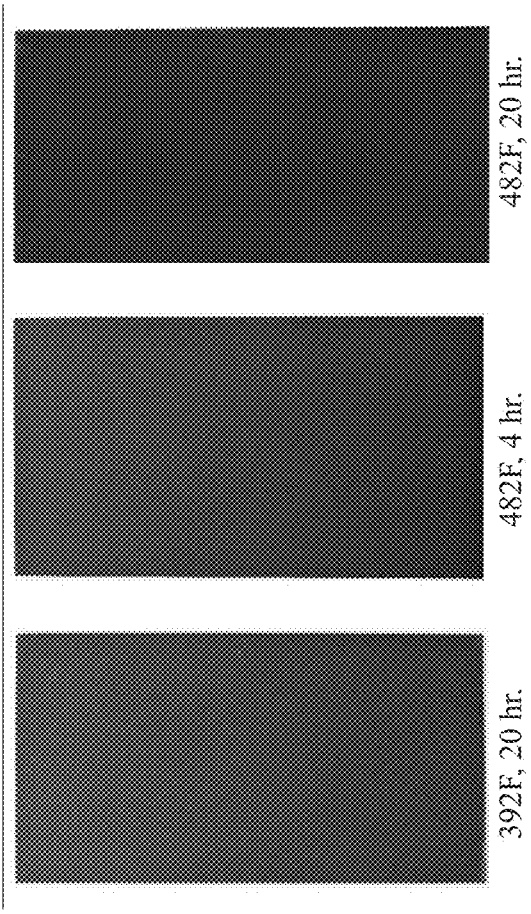
FIG. 6B shows photographs of three coated panels of another variation of Example Formulation 20 also tested for heat resistance at 392° F. for 20 hours, 482° F. for 4 hours, and 482° F. for 20 hours, respectively.

FIG. 6a shows photographs of the coated panels of Example Formulation 20 over a chromated basecoat (e.g., SermeTel™ 1460) after having been exposed to 392° F. for 20 hrs., 482° F. for 4 hours and 482° F. for 20 hours. FIG. 6b shows photographs of coated panels of another coating system consisting of an Example Formulation 20 topcoat also over the same chromated basecoat as in FIG. 6a and which is subject to 392° F. for 20 hrs., 482° F. for 4 hours and 482° F. for 20 hours. Discoloration of the coatings was evident, but there was no cracking or loss of adhesion observed. The test results validated the elevated heat resistance of the inventive coating overlay systems.

Figures 7A, 7B:
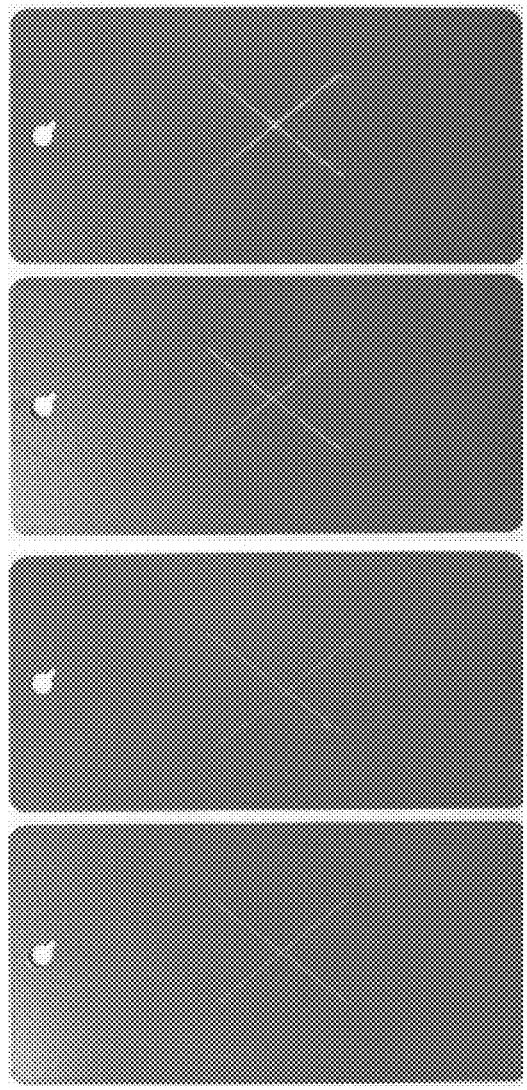
FIG. 7A shows photographs of two coated panels, each having a coating system including as a topcoat the Example Formulation 20 with an optional polyamideimide-based intermediate, and chrome-containing SermeTel™ 1460 basecoat and each tested for Salt Spray Resistance at 1840 hours in accordance with the principles of the present invention.
FIG. 7B shows photographs of two coated panels having an Example Formulation 20 topcoat, a polyurethane-based intermediate and chrome-containing SermeTel™ 1460 basecoat and each tested for Salt Spray Resistance at 1450 hours in accordance with the principles of the present invention.

FIG. 7a shows photographs of two scribed coated panels after subject to a salt fog chamber. Each panel had the same coating system with the topcoat of Example Formulation 20, an intermediate coat and the chrome-containing SermeTel™ 1460 basecoat whereby each of the panels were tested for Salt Spray Resistance at 1840 hours per applicable ASTM standards as mentioned hereinabove. FIG. 7b shows photographs of two scribed coated panels after subject to a salt fog chamber. Each panel in FIG. 7b had the Example Formulation 20 topcoat and the chrome-containing SermeTel™ 1460 basecoat with a different intermediate coat than that of FIG. 7a, whereby each of the panels of FIG. 7b were tested for Salt Spray Resistance at 1450 hours per applicable ASTM standards. All panels passed the test, thereby further validating the corrosion resistance of the inventive coating systems.

Figure 8A:
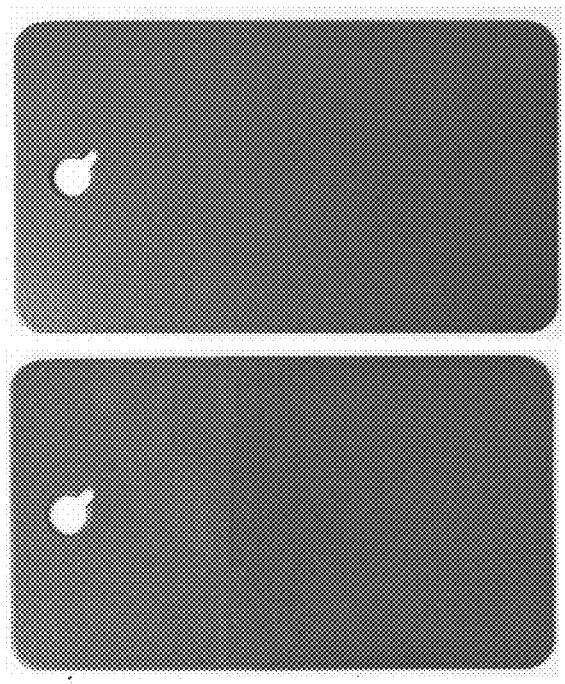
FIGS. 8A and 8B shows photographs of coated panels with two different coating systems with each having a topcoat of Example Formulation 20, and a chrome-containing basecoat, whereby
Figure 8B:
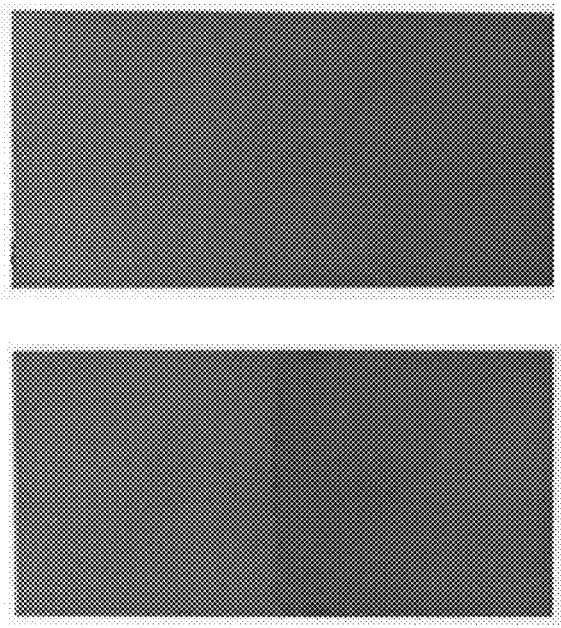

FIGS. 8a and 8b shows photographs of coated panels with an Example Formulation 20 topcoat and a chrome-containing SermeTel™ 1460 basecoat, whereby FIG. 8a represents test results for fluid resistance in 0.5 wt. % Sulfuric acid $H_2SO_4$ (aq.) for 1000 hours and FIG. 8b represents tests results for fluid resistance in an elevated salinity aqueous solution of 5.0 wt. % sodium chloride NaCl (aq.) for 1000 hours. FIGS. 8a and 8b show acceptable fluid resistance test results, thereby further validating the corrosion resistance of the inventive coating systems. The performance results provided for Formulation 20 are expected to also be exhibited by Formulations 15-19 and 21-22, as a result of all of the Formulations 15-22 utilizing similar chemistries for "total polyols" and "total isocyanates" as shown in Table 4. Accordingly, the present invention as demonstrated herein offers novel polyurethane compositions with improved erosion resistance while maintaining requisite film properties.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. A multicomponent slurry composition for the production of an overlay erosion and corrosion resistant coating system for protection of one or more metal components from corrosion, erosion and fouling, said slurry composition comprising:
   a basecoat slurry;
   a topcoat slurry, comprising:
      a branched polyester polyol;
      a polycarbonate diol;
      an aliphatic trimer of hexamethylene diisocyanate;
      wherein a ratio of equivalent isocyanate functional groups to equivalent alcohol functional groups ranges from 1.0:1.6 to 1.6:1.0; and
      one or more metal oxide pigments.

2. The multicomponent slurry composition of claim 1, wherein each of said one or more metal oxide pigments has a Mohs hardness of at least about 6.

3. The multicomponent slurry composition of claim 1, wherein the branched polyester polyol has an equivalent weight of about 470-500 grams per equivalent alcohol functional group (OH).

4. The multicomponent slurry composition of claim 1, wherein the polycarbonate diol has an equivalent weight of about 210-240 grams per equivalent alcohol functional group (OH).

5. The multicomponent slurry composition of claim 1, wherein the aliphatic trimer of hexamethylene diisocyanate has an equivalent weight of about 260-290 grams per equivalent isocyanate functional group (NCO).

6. The multicomponent slurry composition of claim 1, wherein the ratio of the equivalent isocyanate functional groups to the equivalent alcohol functional groups ranges from 1.0:1.0 to 1.0:1.4.

7. The multicomponent, slurry composition of claim 1, where the ratio of the equivalent isocyanate functional groups to the equivalent alcohol functional groups is 1.2:1.0.

8. The multicomponent, slurry composition of claim 1, wherein the basecoat slurry comprises a chromate-phosphate binder and aluminum-containing particles.

9. The multicomponent, slurry composition of claim 1, wherein the basecoat slurry binder does not contain chromium, and further wherein the slurry composition comprises an organic solvent.

10. The multicomponent, slurry composition of claim 1, wherein the basecoat slurry comprises:
    a binder comprising an aqueous solution of lithium doped potassium silicate, the binder characterized by an absence of chromium;
    an organic solvent;
    aluminum or aluminum alloy particles incorporated into the binder;
    wherein the aluminum or aluminum alloy particles comprise a particle size distribution characterized in that the 50th percentile of the particle size distribution has a diameter of between about 4 to 7 microns and the 90th percentile of the particle size distribution has a diameter of less than or equal to about 11.5-15.5 microns.

11. The multicomponent, slurry composition of claim 1, wherein the basecoat slurry comprises:
    a binder comprising an aqueous solution of lithium doped potassium silicate, the binder characterized by an absence of chromium;
    an organic solvent;
    an aluminum powder or an aluminum alloy powder incorporated into the binder; and
    a cure catalyst comprising nano-sized cerium oxide colloidal solution.

12. An overlay erosion and corrosion resistant coating system for protection of metal components from corrosion, erosion and fouling, said coating comprising:
    a corrosion resistant basecoat comprising a matrix formed by a chromate-phosphate based binder filled with aluminum particles; and
    a topcoat comprising a polyurethane-based matrix formed by polymerization of a polyol, a diol and a polyisocyanate;
    one or more metal oxide pigments embedded into the polyurethane-based matrix;
    wherein the overlay erosion and corrosion coating system has an enhanced particle erosion resistance as measured by a Falling Sand method.

13. The overlay erosion and corrosion resistant coating of claim 12, said one or more metal oxide pigments having a pigment volume concentration (PVC) greater than 20 vol % and less than 60 vol % based on a total volume of the cured coating.

14. The overlay erosion and corrosion resistant coating of claim 12, wherein the coating has a heat resistance at elevated temperatures of up to about 482° F.

15. An overlay erosion and corrosion resistant coating system for protection of metal components from corrosion, erosion and fouling, said coating system comprising:
    a corrosion resistant basecoat comprising a matrix formed by a hexavalent chromium-free, silicate-based binder filled with aluminum particles;
    a topcoat comprising a polyurethane-based matrix formed by polymerization of a polyol, a diol and a polyisocyanate with an organic solvent;
    one or more metal oxide pigments embedded into the polyurethane-based matrix;
    wherein the overlay erosion and corrosion resistant coating system has an enhanced particle erosion resistance as measured by a Falling Sand method.

16. The erosion and corrosion resistant coating of claim 15, said one or more metal oxide pigments embedded into the polyurethane-based matrix having a pigment volume concentration (PVC) greater than 20 vol % and less than 60 vol % based on a total volume of the coating.

17. The overlay erosion and corrosion resistant coating system of claim 15, wherein the binder of the basecoat is potassium silicate doped with lithium;
    the basecoat further comprising an aluminum or aluminum alloy particles incorporated into the binder, wherein the aluminum or aluminum alloy particles comprises a particle size distribution characterized in that the 50th percentile of the particle size distribution has a diameter of between about 4 to 7 microns and the 90th percentile of the particle size distribution has a diameter of less than or equal to about 11.5-15.5 microns.

18. The overlay erosion and corrosion resistant coating system of claim 15, wherein the basecoat further comprises:
    a cerium containing compound, said cerium-containing compound impregnated into the ceramic matrix as a cerium-containing phase.

19. The overlay erosion and corrosion resistant coating system of claim 15, wherein the basecoat further comprises zinc-containing particles embedded within said matrix.

20. The erosion and corrosion resistant coating system of claim 15, wherein the one or more metal oxide pigments embedded into the polyurethane-based matrix comprises a cobalt chrome spinel.

21. The erosion and corrosion resistant coating system of claim 15, wherein the polyurethane-based top coating exhibits thermal stability at elevated temperatures of up to about 482° F.

22. An overlay erosion and corrosion resistant coating system for protection of metal components from corrosion, erosion and fouling, said coating comprising:
- a corrosion resistant basecoat comprising a matrix formed by a chromate-phosphate based binder filled with aluminum particles;
- a topcoat comprising a polyurethane-based matrix;
- one or more metal oxide pigments embedded into the polyurethane-based matrix, said one or more metal oxide pigments having a pigment volume concentration (PVC) greater than 20 vol % and less than 60 vol % based on a total volume of the coating;
- wherein the overlay erosion and corrosion resistant coating has an enhanced particle erosion resistance as measured by a Falling Sand method.

23. An overlay erosion and corrosion resistant coating system for protection of metal components from corrosion, erosion and fouling, said coating comprising:
- a corrosion resistant basecoat comprising a matrix formed by a hexavalent chromium-free, silicate-based binder;
- a topcoat comprising a non-dispersed polyurethane-based matrix;
- one or more metal oxide pigments embedded into the polyurethane-based matrix, said one or more metal oxide pigments having a pigment volume concentration (PVC) greater than 20 vol % and less than 60 vol % based on a total volume of the coating
- wherein the overlay erosion and coating resistant system has an enhanced particle erosion resistance as measured by a Falling Sand method.

24. The multicomponent slurry composition of claim 1, wherein the branched polyester polyol is a Polyol 1 and the polycarbonate diol is a Polyol 4 and further wherein the branched polyester polyol is characterized by an absence of Polyol 2.

25. The multicomponent slurry composition of claim 24, wherein the mass ratio of the Polyol 4 to the Polyol 1 is approximately 1.7:1 or greater up to about 2:1.

26. The multicomponent slurry composition of claim 1, wherein the isocyanate functional group is an Isocyanate 1, Isocyanate 2 or Isocyanate 3.

27. The multicomponent slurry composition of claim 1, wherein the polycarbonate diol is a Polyol 4.

28. The multicomponent slurry composition of claim 1, further comprising one or more metal oxide pigments, said one or more metal oxide pigments selected from the group consisting of Pigment 1, Pigment 2, Pigment 3, Pigment 4, Pigment 5, Pigment 7, or any combination thereof.

29. The multicomponent slurry composition of claim 1, further comprising one or more anti-oxidant based additives.

* * * * *